Jan. 2, 1934.  S. W. CRAWFORD  1,941,789
BEARING
Filed July 28, 1930
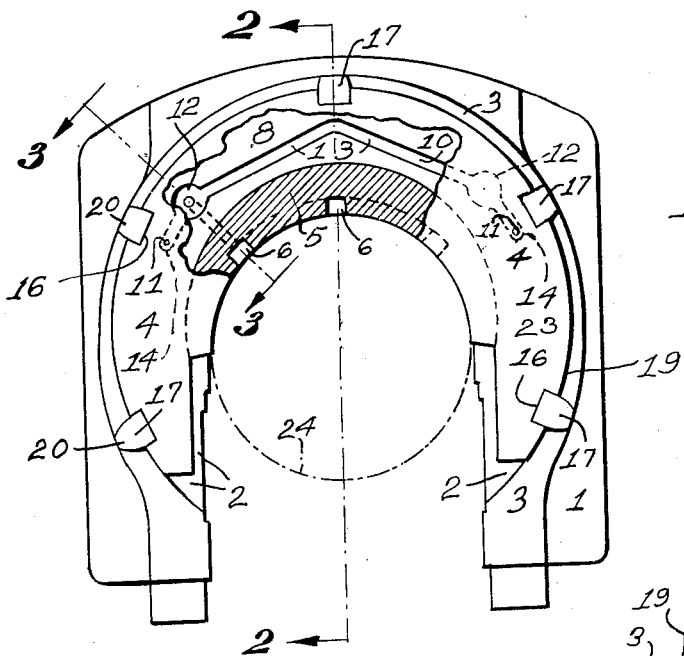
Fig·1·
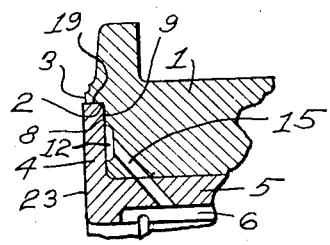
Fig·3·
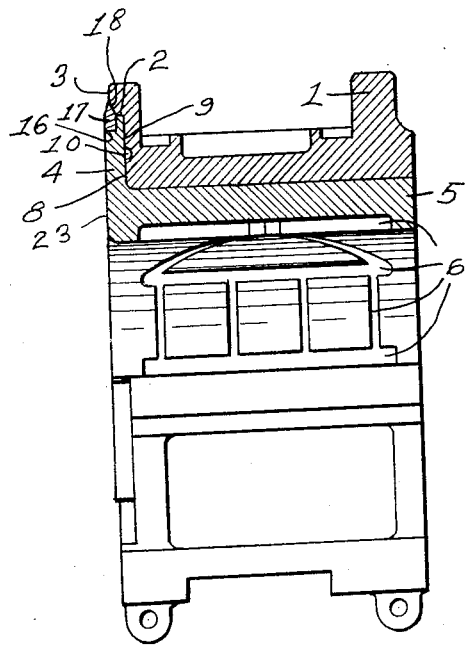
Fig·2·
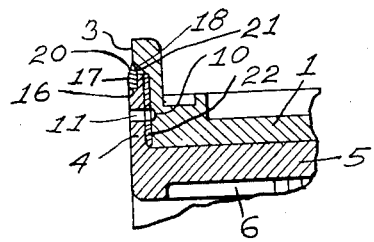
Fig·4·
INVENTOR:
Samuel W. Crawford,
BY Hugh K. Wagner
ATTORNEY.

Patented Jan. 2, 1934

1,941,789

UNITED STATES PATENT OFFICE 1,941,789

BEARING

Samuel W. Crawford, St. Louis, Mo., assignor to National Bearing Metals Corporation, St. Louis, Mo., a corporation of New York Application July 28, 1930. Serial No. 471,240

9 Claims. (Cl. 308—79)

This invention relates generally to bearings, and has more specific reference to improvements in a bearing of the combination-thrust-and-journal type, such as a locomotive driving box. In some of its aspects, the invention is an improvement on the driving box disclosed in United States Patent 1,657,881, granted to applicant January 31, 1928. The driving box of the aforesaid patent included a lateral bearing plate welded to the inner side face of the body of the box, the lateral plate, having its inner face provided with a circumferentially extending recess embodying enlarged pockets connected by constricted necks, and said plate having perforations that extend from said pockets to its outer face, the body having a lubricant duct that extends from the journal bearing to the said recess. In practice, the lateral plates of a locomotive driving box must be renewed at least two or three times as often as the crown bearings or journal receiving brasses, and, by reason of the weakening of the lateral plates by the recesses on their inner faces, they must be entirely removed and new ones substituted therefor when the wear on their outer faces exceeds that permitted in the practice.

Accordingly, one purpose of the present invention is the provision of a driving box in which the lubricant recesses will be located in the inner face of the body of the box to which the lateral plate is applied, rather than in the under face of the plate, thereby avoiding the weakening of the plate by such recesses, and so allowing it to be reused.

Another object is to provide improved means for attaching the lateral plate to the inner face of the body of the box.

Another object is to form the journal brass and the lateral plate integral with one another, thereby obviating the fitting of these elements to one another.

Other objects, advantages and desirable features of the invention will appear in the course of the following description of an illustrative embodiment of the spirit thereof.

In the accompanying drawing forming part of this specification, in which like numbers of reference denote like parts wherever they occur, Figure 1 is a side elevation of a locomotive driving box embodying the present invention;

Figure 2 is a sectional view taken on the line 2—2 in Figure 1;

Figure 3 is a fragmentary sectional view taken on the line 3—3 in Figure 1; and

Figure 4 is a fragmentary view similar to Figure 2 showing the manner of re-using a worn lateral plate.

The box body or box proper 1 is ordinarily an iron or steel casting of the usual type, recessed at 2, in its inner face 3, to receive the lateral or thrust plate 4, preferably cast integral with the crown journal lining or bearing 5, the crown 5 and its flange or plate 4 being conventionally of brass. The crown brass 5 preferably contains the usual lubricant-distributing grooves 6 in its journal-engaging face 7. The retracted face 8 of the recess 2 abuts against the underface 9 of the plate 4, and is provided with a substantially circumferentially extending recess 10 for the distribution of lubricant to suitably distributed perforations 11 in the wear-receiving lateral plate or flange 4. The recess 10 comprises enlarged portions or pockets 12 connected by constricted necks 13, each of the pockets 12 communicating with a juxtaposed perforation 11 preferably through a short constricted passageway 14. A lubricant duct 15 conveys lubricant from a groove 6 to a pocket 12.

The wear-receiving lateral plate 4 is provided in its periphery with a series of notches or recesses 16, to receive lugs 17 of welding material, such as Tobin bronze. The lugs 17 project over the face 3 of the body 1, and preferably into recesses or notches 18 in said face 3 that open into the line or shoulder 19 of continuity of the plate 4 and face 3. The notches 16 are preferably not deep enough to reach the underside 9 of the flange 4, so that the underside 9 is not welded to the abutting retracted face 8 of the body 1, but the welding to the face 3 of the body is confined to portions thereof outside the periphery of the flange 4, thereby facilitating the detachment of the flange 4 from the body without mutilating the flange when excessive wear thereon necessitates its removal for readjustment or replacement. The outer ends 20 of the welding lugs 17 are preferably beveled for the sake of smoothness, and, when it is desired to remove the plate 4, to facilitate the severance of the lugs 17 from the recesses 18 in the body 1 rather than from the recesses 16 in the flange 4, the bottoms 21 of the recesses 18 being beveled or inclined to cooperate for that purpose with the abutting beveled edges of the lugs 17. The lugs 17 are preferably preformed to fit the notches 16 and 18; the brass is placed in the box with the flange 4 abutting against the retracted face 8 of the body 1; and the lugs 17 placed in the notches 16 and 18 and welded thereto, suitable flux, of course, being employed. To remove the thrust flange 4 from the body 1, the lugs are preferably detached only from the recesses 18 by sawing or clipping or heating or in any other suitable manner. To compensate for the wear on the exposed face of the removed flange 4, a liner 22 of sheet or plate brass or other suitable material of the proper thickness is inserted underneath the flange 4 and the flange pressed home toward the body 1 and the holding lugs 17 rewelded to the recesses 18, as shown in figure 4. The liner 22 is perforated in registry with the perforations 11 of the flange 4. Any suitable number of such perforations 11 may be provided in the flange 4, the flange of Figure 4 showing a port 11 in a position not shown in the flange as apertured in Figure 2. It will be observed that the lugs 17 are solidly anchored in the flange 4 and the body 1, so that the flange 4, in addition to being welded to the body, is also, in effect keyed thereto, thereby forming a very rigid connection for resisting the torque exerted on the flange 4 by the frictional engagement therewith of the hub of the drive wheel. By reason of the flange 4 being formed integral with the crown 5, the latter also reinforces the flange in resisting the said torque. It will be appreciated, therefore, in view of these features, that the plate need be welded to the body only at intervals, and that the welding area at these intervals may be much smaller than heretofore required, thereby facilitating the removal of the plate when desired, and without damaging the plate.

The mode of lubricating the exposed or hub-contacting face 23 of the lateral thrust flange 4 will be quite apparent. Grease is forced against the lower side of the axle journal through the usual well-known screen by the usual spring pressure. When the axle begins to turn, its journal 24 becomes hot, melting some of the grease and carrying it around up into the grooves 6. The grooves become filled and grease enters the portway 15 and its adjacent pocket 12, and, through the constricted passageway 13, the other pocket 12. From the pockets 12 it passes into the recesses 14 and thence through the ducts 11 to the hub-contacting face 23. The pressure on the grease in the grooves 6 increases in the direction of rotation of the axle, and the most suitable pressure necessary for forcing the grease to the recess 10 may be selected by locating the entrance of the passage 15 at a more or less advanced point in the journal engaging portion 5 with respect to the direction in which the axle rotates. The most suitable location for the entrance of the passage 15, for a road engine, is preferably about forty-five degrees from the horizontal in the direction of rotation of the axle, any greater angle producing ordinarily too great a pressure in the pockets 12 with a too profuse flow of lubricant from the ports 11. In a switch engine, whose axle rotates as often in one direction as in the other, it is preferable to provide two passages 15, one for each direction of rotation of the axle. The pockets 12 being close to the surface 23, any friction thereat produces heat which increases the pressure in the pockets and expels the lubricant proportionately as needed. The purpose of making the passages 13 and 14 narrower than the comparatively wide storage pockets 12 is to introduce a resistance to the flow of lubricant from the pockets 12 to the ports 11, thereby building up a pressure in the pockets 12 and ensuring their being completely filled with lubricant that is in contact with the flange 4, whereby the volume of the lubricant in the packets 12, and consequently its pressure, more readily responds to changes in the temperature of the lateral plate 4, and thereby regulates the flow of lubricant through the ports 11, so that the lubricant flow is a function of the temperature.

Having thus fully described this invention, I hereby reserve the benefit of all changes in form, arrangement, order, or use of parts, as it is evident that many minor changes may be made therein without departing from the spirit of this invention or the scope of the following claims,

I claim:

1. A thrust bearing including a body and a wear-receiving plate thereon having a series of notches in the outer edge of its exposed face, and welding material in the said notches and extending beyond the said outer edge and upon the said body for securing the plate to the body, the said notches not being deep enough to reach the underside of the plate.

2. A bearing including a body and a brass therein, said brass comprising a journal-engaging portion and an exterior radial flange formed integral therewith at one end and having a series of notches in its periphery, and welding material in the said notches uniting the flange to the abutting end face of the body, the said welding material not extending to the underside of the flange.

3. A brass for a locomotive driving box including a journal-engaging portion and a hub-contacting flange formed integral therewith, said flange having a series of notches in its outer edge for the purpose set forth, said notches not extending to the underside of the plate.

4. A hub-contacting plate for a locomotive driving box having a series of notches in its periphery for the purpose set forth, said notches not extending to the underside of the plate.

5. A thrust bearing including a body having a side face and a lateral wear-receiving plate secured to the side face, the side face being recessed for the distribution of lubricant to divers portions of the lateral plate, and the lateral plate being perforated to conduct the lubricant from its inner to its outer face, the recess in the side face comprising enlarged pockets connected by constricted necks, each of said pockets being in immediate communication with a respective perforation in the lateral plate.

6. A combined thrust and journal bearing including a body and a wear-receiving plate borne by the lateral face of the body, the bearing having a lubricant duct extending from its journal engaging face to the said lateral face, the wear-receiving plate being provided with a plurality of suitably distributed perforations, and the said lateral face being recessed for the distribution of lubricant from the said duct to the said perforations, the recess in the said lateral plate being substantially wider than the said perforations to form a lubricant reservoir.

7. A combined thrust and journal bearing including a journal-engaging portion and a lateral plate formed integral therewith, and a body for receiving said journal-engaging portion and having a lateral face that bears the said lateral plate, there being a lubricant duct extending through the said body from its lateral face to the said journal engaging portion, the journal engaging portion being perforated at the point meeting said duct, the lateral plate being perforated and the said lateral face being recessed to effect communication between the said duct and the perforation of the lateral plate, the recess in the said lateral face being comparatively wide and shallow with relation to the said duct and the perforation of the lateral plate.

8. A thrust bearing including a body having a thrust face, and a wear-receiving plate on the said face and located inwardly of and spaced from the outer edge of the said face, the part of the thrust face of the body that is disposed adjacent to and exteriorly of the outer edge of the plate having notches that are disposed directly opposite notches in the outer edge of the plate, the notches in the plate not extending to its underside, and weldable means in the opposing notches uniting said body and said plate.

9. A thrust bearing including a body having a recessed thrust face, and a wear-receiving plate in the said recess and of sufficient thickness to project exteriorly of the plane of the thrust face of the body, the thrust face having notches in the periphery of the recess, and the plate having notches in its edge that register with the notches of the thrust face, the bottoms of the notches being located higher than the bottom of the recess, and weldable lugs in the co-registering notches of the plate and face.

SAMUEL W. CRAWFORD.